(12) United States Patent
Egashira et al.

(10) Patent No.: US 7,331,683 B2
(45) Date of Patent: *Feb. 19, 2008

(54) DECORATIVE ARTICLE AND VEHICULAR LAMP

(75) Inventors: Ken Egashira, Kanagawa (JP); Motoaki Muraoka, Shizuoka (JP); Hirofumi Nitta, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/673,789

(22) Filed: Feb. 12, 2007

(65) Prior Publication Data

US 2007/0127248 A1    Jun. 7, 2007

Related U.S. Application Data

(63) Continuation of application No. 10/492,662, filed as application No. PCT/US02/35037 on Nov. 8, 2004, now Pat. No. 7,175,293.

(30) Foreign Application Priority Data

Nov. 2, 2001    (JP)    ............................. 2001-337899

(51) Int. Cl.
   *F21V 9/16* (2006.01)
(52) U.S. Cl. ..................... 362/84; 362/351; 362/507
(58) Field of Classification Search ............... 362/84, 362/351, 507, 510, 538, 539, 293
   See application file for complete search history.

(56) References Cited

U.S. PATENT DOCUMENTS

| | | | |
|---|---|---|---|
| 2,252,324 A | 8/1941 | Land | |
| 2,453,194 A | 11/1948 | Buzzell | |
| 2,702,862 A * | 2/1955 | Finney | 250/435 |
| 2,748,659 A | 6/1956 | Geffcken et al. | |
| 2,887,566 A | 6/1959 | Marks | |
| 3,000,774 A | 9/1961 | Swedlow et al. | |
| 3,153,740 A | 10/1964 | Murphy | |
| 3,270,201 A * | 8/1966 | Hardesty | 250/458.1 |
| 3,372,504 A | 3/1968 | Hardesty | |
| 3,513,305 A | 5/1970 | Joncas | |
| 3,528,723 A | 9/1970 | Rogers | |
| 3,596,095 A * | 7/1971 | Leach | 250/461.1 |
| 3,690,721 A * | 9/1972 | Herbert et al. | 296/78.1 |
| 3,796,869 A | 3/1974 | Stone | |
| 3,912,842 A | 10/1975 | Swartz | |
| 4,023,889 A | 5/1977 | Eagon et al. | |
| 4,128,864 A | 12/1978 | Brussee et al. | |
| 4,153,928 A | 5/1979 | Speedy | |
| 4,161,388 A * | 7/1979 | Bouchard et al. | 431/359 |
| 4,210,953 A * | 7/1980 | Stone | 362/189 |
| 4,546,416 A * | 10/1985 | Pemberton | 362/84 |

(Continued)

*Primary Examiner*—Sandra O'Shea
*Assistant Examiner*—Gunyoung T. Lee
(74) *Attorney, Agent, or Firm*—Harold C. Knecht, III

(57) ABSTRACT

A decorative article capable of being used in combination with an article having a light source and of remarkably improving the decorative effect together with the light source. The decorative article is attached to an article having a light source, and comprises, at least, an appearance-providing layer defining an appearance of the decorative article, and a light-storage layer which is disposed under the appearance-providing layer and is able to store the light from the light source and generate afterglow.

12 Claims, 3 Drawing Sheets

U.S. PATENT DOCUMENTS

| | | | |
|---|---|---|---|
| 4,561,042 A * | 12/1985 | Wehner et al. | 362/30 |
| 4,673,609 A | 6/1987 | Hill | |
| 4,766,526 A * | 8/1988 | Morimoto et al. | 362/255 |
| 4,826,727 A * | 5/1989 | Glaser | 428/403 |
| 4,912,606 A | 3/1990 | Yamamoto | |
| 5,001,610 A * | 3/1991 | Otaka | 362/510 |
| 5,132,589 A * | 7/1992 | Friedman | 313/484 |
| 5,448,454 A | 9/1995 | Nonaka | |
| 5,571,277 A | 11/1996 | Allred et al. | |
| 5,607,222 A * | 3/1997 | Woog | 362/84 |
| 5,745,266 A | 4/1998 | Smith | |
| 5,803,529 A | 9/1998 | Perry-Bores et al. | |
| 5,833,349 A | 11/1998 | Apple | |
| 5,931,566 A * | 8/1999 | Fraizer | 362/293 |
| 5,933,084 A | 8/1999 | Ravier et al. | |
| 6,068,383 A * | 5/2000 | Robertson et al. | 362/84 |
| 6,074,079 A | 6/2000 | Yanagihara et al. | |
| 6,209,933 B1 * | 4/2001 | Ang et al. | 292/336.3 |
| 6,267,490 B1 | 7/2001 | Funada | |
| 6,409,368 B1 | 6/2002 | Henneboehle et al. | |
| 6,469,622 B1 * | 10/2002 | Komatsu et al. | 340/464 |
| 6,883,938 B1 | 4/2005 | Kohara et al. | |
| 6,893,147 B2 | 5/2005 | Schottland et al. | |
| 6,906,863 B2 | 6/2005 | Yoshida et al. | |
| 7,077,550 B2 * | 7/2006 | Egashira | 362/510 |
| 7,175,293 B2 * | 2/2007 | Egashira et al. | 362/84 |
| 2001/0046140 A1 | 11/2001 | Chase et al. | |
| 2005/0189795 A1 * | 9/2005 | Roessler | 296/215 |
| 2006/0044782 A1 * | 3/2006 | Hsu | 362/34 |

* cited by examiner

DECORATIVE ARTICLE AND VEHICULAR LAMP

CROSS REFERENCE TO RELATED APPLICATIONS

This is a continuation of application Ser. No. 10/492,662, filed Nov. 8, 2004 now U.S. Pat. No. 7,175,293; which was a national stage filing under 35 U.S.C. 371 of PCT/US02/35037 filed Nov. 1, 2002, which International Application was published by the International Bureau in English on May 15, 2003, which claims priority to JP 2001-337899, filed Nov. 2, 2001, the disclosure of which is incorporated by reference in their entirety herein.

FIELD OF THE INVENTION

The present invention relates to a decorative article, and in particular to a decorative article capable of providing an excellent decorative effect in the daytime and an appearance design effect attracting a person's attention in the nighttime when it is attached to a vehicular lamp or other lamp. The present invention also relates to a vehicular lamp having such a novel decorative article.

BACKGROUND OF THE INVENTION

As well known, a vehicular lamp usually comprises a housing having a light-emitting opening provided at the front of it, a lamp cover shaped like a plate or a lens which covers the light-emitting opening, and a light source disposed in a lamp room defined by the housing and the lamp cover. The inner wall of the housing is provided with a reflecting layer integrated with it, or else it is provided with an independent reflector. In such a vehicular lamp, when the light source is lit, the direct light from the light source, and the light reflected by the inner wall of the housing are emitted out of the lamp through the lamp cover, thus performing a desired lighting function.

In recent years, such a vehicular lamp has been required to have not only a lighting function in the lighting state, but also an improved appearance in the non-lighting state in the daytime. Decorative articles often adopted for improving an appearance of a vehicular lamp include a lamp garnish and finisher. These decorative articles are attached to the lamp cover (also called outer cover or the like) of a headlamp, a rear combination lamp, or the like so as to be out of the path of the light from the light source. These decorative articles have the same color as the color of a vehicle's body in many cases, which improves an appearance of a vehicular lamp by the sense of matching the vehicle. Further, these decorative articles can be manufactured in various kinds of thickness by an injection molding, vacuum forming, extrusion molding, or the like of resin, or coating of paint or the like, or the like, and are allowed to have an appearance design effect by using resin-coloring, painting, printing, plating, or the like. Such decorative articles are, in most cases, compressed and attached to a subject through a pressure-sensitive adhesive layer provided at the back of it.

However, the decorative articles as described above are used for improving an appearance of a vehicular lamp in a light environment in the daytime, and an improvement of an appearance like that in the daytime thus can not be expected in a light condition in the nighttime. Furthermore, conventional decorative articles are mainly used for concealing the external portion of a lamp in order to solve the problem that a marginal rib portion or black adhesive portion of the lamp is seen through the cover, but can not enhance the decorative effect together with the lamp itself.

For reference, in Japanese Utility Model Registration No. 3035801, it is disclosed that a light-transmittive/storage/emitting transfer seal is adhered to the inner surface of a headlamp of a vehicle to indicate the existence of the vehicle in a dark parking lot. Furthermore, in Japanese Unexamined Patent Publication (Kokai) No. 11-11368, it is disclosed regarding a headlamp of a vehicle that a light-emitting element made of a light-storing material is disposed near the internal reflector of the headlamp and emits light while the vehicle is stopping to allow drivers and pedestrians around the vehicle to recognize the existence of the vehicle. However, these lamps are designed to improve only a visibility by utilizing emission after being turned off, but do not have any decorative effect when it is lit in the daytime, and are not designed to improve the appearance in the nighttime. Furthermore, in case of the former idea about a headlamp of a vehicle, transparency of portions at which the seal is adhered is slightly poor, thus causing the degradation of the appearance if anything while the lamp is not lit.

SUMMARY OF THE INVENTION

It is therefore an object of the present invention to solve one or more problems in the art. For example, it can be an object of the present invention to provide a decorative article capable of being used in combination with an article having a light source and remarkably enhancing the decoration effect together with the light source.

It can be another object of the present invention to provide a decorative article capable of providing an excellent decorative effect in the daytime and an appearance design effect attracting a person's attention in the nighttime when it is attached to a vehicular lamp or other lamp.

It can be a further object of the present invention to provide a vehicular lamp which is able to provide an excellent decorative effect in the daytime and an appearance design effect attracting a person's attention in the nighttime and does not violate current laws.

In one aspect of the present invention, a decorative article is provided that is intended to be attached to an article having a light source. The decorative article comprises at least an appearance-providing layer defining an appearance of the decorative article, and a light-storage layer which is disposed under the appearance-providing layer and is able to store the light from the light source and generate afterglow.

In another aspect of the present invention, a vehicular lamp is provided that comprises a light source, a housing accommodating the light source and defining a lamp room, a light-emitting opening provided at the front of the housing, and a light-transmittive lamp cover attached to the light-emitting opening, wherein a non-light-emitting area of the lamp cover, which does not substantially concern the emission of the light from the light source, is provided with a decorative article comprising, at least, an appearance-providing layer defining an appearance of the decorative article, and a light-storage layer which is disposed under the appearance-providing layer and is able to store the light from the light source and generate afterglow.

DETAILED DESCRIPTION OF THE INVENTION

A vehicular lamp according to the present invention can be used in various fields as an illumination means, indicating means, signaling means, or the like, and thereby the basic form of the vehicular lamp is not limited provided that it satisfies the requirement of comprising a light source, a housing capable of reflecting the light from the light source at the inner wall thereof, a light-emitting opening, and a lamp cover covering the light-emitting opening. An example of such vehicular lamp is but not limited to a head lamp, fog lamp, clearance lamp, stop lamp, tail lamp, turn signal lamp, backup lamp, or the like. Furthermore, such vehicular lamp may be a combination of a plurality of lamps, which may be used as, for example, a rear combination lamp at the rear of a vehicle, or a front combination lamp at the front of a vehicle. Such vehicular lamp is in particular advantageously used as a headlamp for the implementation of the present invention.

Vehicles provided with a vehicular lamp according to the present invention include but not limited to a passenger car, recreational vehicle, bus, truck, etc. In particular, because of improving an appearance design, the vehicular lamp is suitable for a passenger car.

Figure 1:
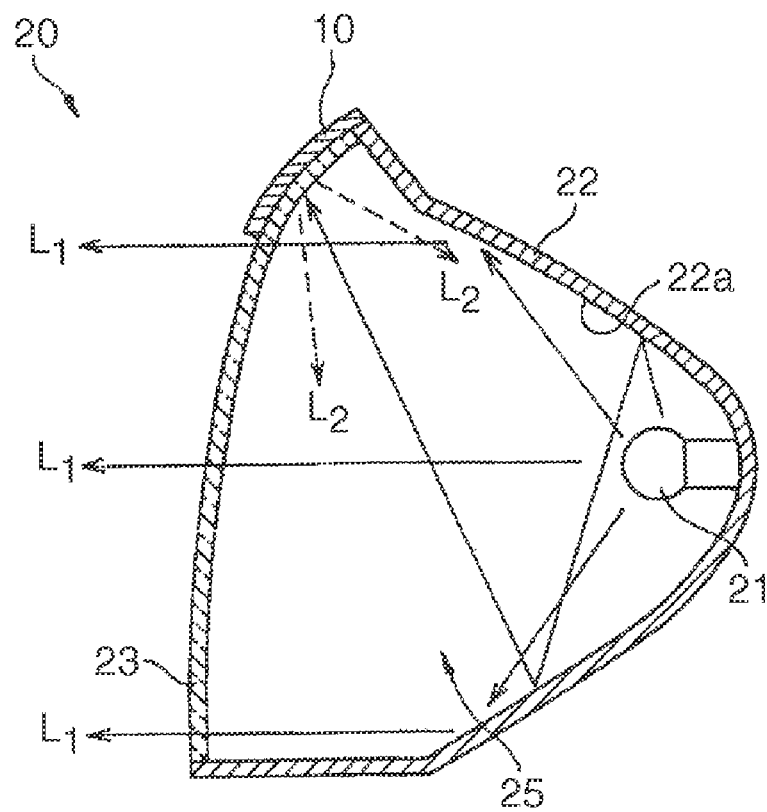
FIG. 1 is a cross-sectional view schematically showing an example of a vehicular lamp according to the present invention.

FIG. 1 shows a typical constitution of a vehicular lamp according to the present invention. The lamp 20 comprises a housing 22, and a lamp room 25 defined by a lamp cover 23 covering the light-emitting opening (emitting zone) at the front of the housing 22. The lamp room 25 may consists of two or more rooms as necessary. Each of the rooms may be independent of one another, or communicate with one another. The lamp room is usually provided with a light source 21 with adequate intensity inserted into a socket (not shown). One light source 21 is provided in the example shown in the figure, but two or more light sources 21 may be provided in one lamp room 25 if necessary.

The inner wall 22a of the housing 22 has a reflective-film structure like a concave mirror from which the light from the light source 21 is reflected in one direction. Such reflective-film structure may be formed, for example, with a playing-tone thin film made by aluminum evaporation. Alternatively, instead of the inner wall, a light reflecting means (which is usually a reflector) such as a concave mirror or the like may be provided in the lamp room 25. The light source 21 may have a cap colored with predetermined color as necessary. Because, when a colored cap is used, a colorless cover can be used instead of a colored cover. The light L1 from the light source 21 is, as shown in the figure, reflected by the inner wall 22a, and then emitted out of the lamp cover 23.

The lamp cover 23 is provided with, particularly for the improvement of an appearance design or the like which is the recent trend, a non-light-transmitting area, i.e., non-light-emitting area which does not substantially concern the emission of the light from the light source 21. Furthermore, this non-light-emitting area is provided with a decorative article 10 having a light-storage layer in accordance with the present invention. In the example shown in the figure, the decorative article 10 is mounted on the outside of the lamp cover 23, but, in the present invention, may be mounted on the inside of it as described below.

In a vehicular lamp according to the present invention, a light-emitting opening (light-emitting area and non-light-emitting area adjacent it) of the lamp room is covered with a lamp cover. The shape of such lamp cover is not limited provided that the lamp cover has a shape and size suitable for covering the light-emitting surface of the lamp room at least, but is typically circle, rectangle, or square, and in some cases may be an odd shape such as ellipse or L-shape.

The lamp cover may be colorless, or may be colored as necessary, that is, according to the hue of the light emitted from it. Incase that the lamp room consists of a combination of two or more rooms, lamp covers may be colored with different colors every room.

A colorless or colored lamp cover can be formed advantageously from optional light-transmittive resin by a forming method. Appropriate forming methods include an ordinary method such as an injection molding method, or vacuum forming method. Furthermore, raw resins used to form the lamp cover include but not limited to styrene resin, rigid vinyl chloride resin, acrylic resin, polycarbonate resin, etc. In particular, acrylic resin can be used advantageously, because it has an excellent strength and transparency and can be colored advantageously. If necessary, the lamp cover may be formed from a glass plate or other transparent material.

When a colored lamp cover is manufactured, adequate amount of coloring material can be mixed into raw resin as described above. Appropriate coloring materials include but not limited to pigment such as perylene pigment, azo pigment, or iron oxide, and dye such as chinophutaron dye, azo dye, zisuazo dye, anthraquinone dye, benzopyrene dye (each from color index).

When the lamp cover is manufactured, additives regularly used in the field of plastic molding may be mixed into resin raw in addition to coloring material. Appropriate additives include, for example, ultraviolet absorber, light stabilizer, heat stabilizer, etc. For example, adequate ultraviolet absorbers include but not limited to benzotoriazole, benzophenone, zifeniruacrylate, amine ultraviolet absorbers, etc.

The lamp cover is usually shaped like a flat plate and has a even surface, but may have a convexo-concave pattern formed on the inner surface (light source's-side surface) of it. Furthermore, a lamp cover having a three-dimensional curved surface or the like may be used for the improvement of an appearance design.

The outer surface (surface facing outward) of a lamp cover usually has nothing, but, if necessary, may be covered with a transparent thin plastic film for protection. Because the lamp cover can be prevented from being broken when small gravel hits it. Adequate plastic films include, for example, a polyester resin film, polyethylene resin film, polycarbonate resin film, vinyl chloride resin film, acrylic resin film, polyurethane resin film, polyolefin resin film, vinylidene fluoride resin film, etc.

A lamp cover according to the present invention is provided with a decorative article according to the present invention on a non-light-emitting area thereof, i.e., a non-light-transmittive area from which the light emitted from a light source disposed in a lamp room does not transmit, or which does not need to allow such light to transmit it.

Although a non-light-emitting area of the lamp cover may be provided in various areas, it is usually provided in the area around the light-emitting opening of the lamp room. That is, the non-light-emitting area is the marginal area of a headlamp, turn signal lamp, backup light, or the like. These non-light-emitting areas may take an optional shape in accordance with the area around the light-emitting opening.

Figure 2:
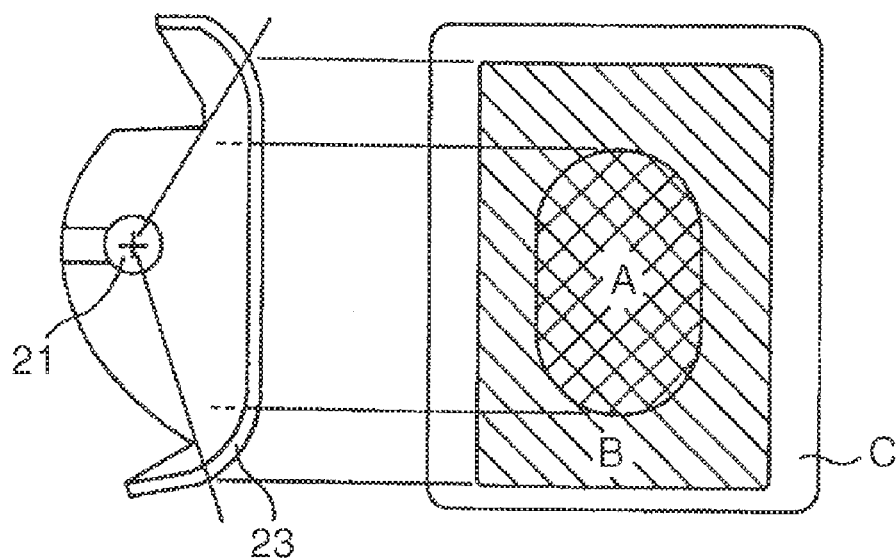
FIG. 2 is a schematic diagram depicting the non-light-emitting area of a vehicular lamp according to the present invention.

Furthermore, a non-light-emitting area of a lamp cover can be defined as an area other than a lighting portion, indicating portion, and reflecting portion based on the inspection performing procedure (see 3-2 in 4-21) in Article 32 of Safety Standard for transportation vehicles. That is, in the schematic diagram shown in FIG. 2, the portion C other than the lens portion A whose intensity is 98% of the center intensity and the lens portion B where direct light comes into is a non-light-emitting area defined in the present invention.

Since a decorative article according to the present invention is disposed restrictedly in a non-light-emitting area as described above which does not affect the traveling of the light from the light source, an excellent decorative effect in the daytime and an beautiful appearance caused by an after-image effect in the nighttime can be accomplished at the same time while meeting the requirement of the vehicle operation rule, or the like. Because an excellent design nature in the daytime can be secured by the appearance-providing layer contained in the decorative article, and the light energy stored in the light-storage layer when the lamp is lit in the daytime generates afterglow L2 by which the inside of the lamp room 25 is illuminated in the nighttime, thus providing a beautiful appearance of the lamp (see FIG. 1).

A decorative article according to the present invention can provide a novel and beautiful appearance which has not been experienced yet, thereby being used widely. The decorative article is typically used for but not limited to a sticker, emblem, lamp garnish, finisher, etc. These decorative articles more than prove their worth particularly when attached to a lamp of a vehicle. Of course, they may be used for a display, etc. as required.

A decorative article according to the present invention can be offered in many forms according to the variety of uses of it. The decorative article is offered typically in the form of a sheet or film, preferably a multilayered sheet or film, but may also be offered in the form of a coating made by painting, a panel in combination with a resin sheet or the like, a resin-formed object, or the like, through the selection of elements constituting the decorative article.

In any form, a decorative article according to the present invention comprises at least (1) a appearance-providing layer defining an appearance of the decorative article, and (2) a light-storage layer which is disposed nearer a light source than the appearance-providing layer, and can store the light from the light source to generate afterglow.

The word "layer" means, when used in the present invention, not only a relatively thin layer or thin film as generally understood, but also, as become apparent in the following detail description, a thick layer, thick coating, film, sheet, formed object having a predetermined thickness, or the like.

In general, an appearance-providing layer which is a first element constituting the decorative article defines the appearance of the decorative article, and for this purpose it may be formed by various methods using various materials according to desired decoration effects. Appropriate appearance-providing layers include but not limited to a printed layer such as ink, a coated layer such as paint, a colored resin layer, a metal-plated layer, a metal-evaporated layer, a metal foil layer, other colored layers, etc., and may be used alone, or in combination of two or more layers. Further, the appearance-providing layer may be a colored member having some thickness and/or form.

A light-storage layer used in combination with an appearance-providing layer must be able to store the light from a light source and generate afterglow. The light-storage layer itself may thus include of a layer made of a material having light storage ability (light storage material), or a layer containing a light storage material. Considering manufacturing efficiency, cost, etc., it is advantageous to form a light-storage layer from a material containing a light storage material. Although a light-storage layer is usually provided through the whole area of a decorative article together with an appearance-providing layer, it may be provided restrictedly for part of the area of the decorative article if a desired light storing effect is obtained. The light-storage layer may be used alone, or in combination of two or more layers, and may be a colored member having some thickness and/or form.

A decorative article according to the present invention may optionally have additional layers added to an appearance-providing layer and a light-storage layer. The decorative article may have, for example, additional layers such as a junction layer, supporting layer, base layer, adhesive layer, and clear layer. For example, the decorative article is preferably adhered to the lamp cover usually through an adhesive layer consisting of a pressure-sensitive adhesive or heat-sensitive adhesive. And, a pressure sensitive adhesive double-coated tape or the like may be used instead of such adhesive layer if necessary. Furthermore, when the decorative article is adhered to the outer surface of the lamp cover, a clear layer is preferably further provided as the outermost layer of the decorative article.

Figure 3:
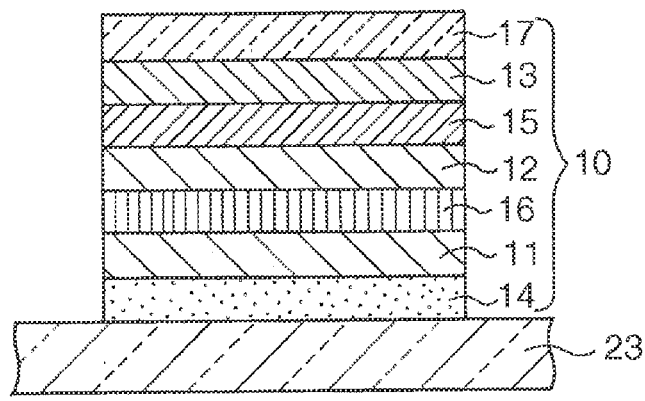
FIG. 3 is a cross-sectional view showing an typical embodiment of a decorative article according to the present invention.
Figure 4:
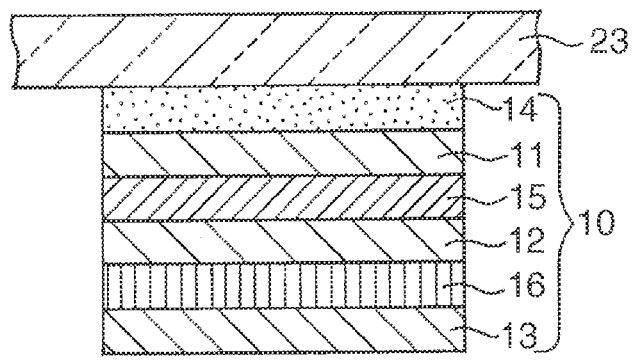
FIG. 4 is a cross-sectional view showing another typical embodiment of a decorative article according to the present invention.

A decorative article according to the present invention may be adhered to the outer surface of the lamp cover or the inner surface of the lamp cover. A basic constitution of a decorative article according to the present invention is described below in connection with the above two cases. In FIGS. 3 and 4 referred in the following description, a decorative article in the form of multilayered film is shown. However, as already described, the decorative article may be a member having some thickness and shape, or may not be a continuous layer. Furthermore, a decorative article may be installed optionally by a method other than a method using an adhesive shown in the figure.

FIG. 3 is a cross-sectional view of an example of a decorative article according to the present invention adhered to the outer surface of a lamp cover. The decorative article 10 comprises, in the order seen from the lamp cover 23, an adhesive layer 14, a first intermediate layer 11, a light-storage layer 16, a second intermediate layer 12, a appearance-providing layer 15, a third intermediate layer 13, and a clear layer (surface layer) 17. The light-storage layer 16 may also serve as the first intermediate layer 11. The first, second, and third intermediate layers 11, 12, and 13 are optional, and can act as a junction layer, supporting layer, and base layer respectively. These intermediate layers may be a single layer or a multiplayer consisting of two or more layers. Furthermore, the first and third intermediate layers 11 and 13 are colorless and transparent in principle, and at least must not affect a design effect originated from the appearance-providing layer 15 and the transmission of afterglow from the light-storage layer 16. And, the adhesive layer 14 must pass afterglow from the light-storage layer 16. Optional layers disposed under the appearance-providing layer 15 (light source side) may have a light storage function if necessary. Otherwise, the light-storage layer 16 may be omitted and the adhesive layer 14 may have a light storage function.

FIG. 4 is a cross-sectional view of an example of a decorative article according to the present invention adhered to the inner surface of a lamp cover. The decorative article 10 comprises, in the order seen from the lamp cover 23, an adhesive layer 14, a first intermediate layer 11, a appearance-providing layer 15, a second intermediate layer 12, a light-storage layer 16, and a third intermediate layer 13. The first, second, and third intermediate layers 11, 12, and 13 are optional, and can act as a junction layer, supporting layer, and base layer respectively. These intermediate layers may be a single layer or a multiplayer consisting of two or more layers. Furthermore, the first and third intermediate layers 11 and 13 are colorless and transparent in principle, and at least must not affect a design effect originated from the appearance-providing layer 15 and the transmission of afterglow from the light-storage layer 16. And, the adhesive layer 14 must not impair the design effect of the appearance-providing layer 15. Optional layers disposed under the appearance-providing layer 15 (light source side) may have a light storage function if necessary.

More specifically, the appearance-providing layer is, as described above, preferably a printed layer, a coated layer, a colored resin layer, a metal-plated layer, a metal-evaporated layer, a metal foil layer, or a other colored layer or colored member.

For example, the colored layer may be formed by using various ordinary thin-film forming methods. That is, the colored layer may be formed by printing, finishing (including electrostatic finishing), or the like of ink or paint having predetermined color tone, or by coating, resin-extruding, or adhering of a film or sheet having a predetermined color tone. The ink and paint may contain bright material such as pearl powder or metal powder, or other additive. The colored layer forming material used in this method preferably has excellent weather resistance or the like required for the lamp cover in addition to coloring nature.

Furthermore, the colored layer may be formed, in an embodiment of it, in the form of a colored film by using a plastic material such as a polyester film, polyethylene film, polycarbonate film, vinyl chloride film, acrylic film, polyurethane film, polyolefin film, or vinylidene fluoride film. The plastic material may be resin alone, or a mixture of resins or polymer. The colored film can be manufactured into a desired thickness in a manner that an adequate coloring material such as pigment or bright material is mixed to raw resin and then an ordinary forming method such as a calender forming method is used.

Alternatively, the colored layer may be formed so as to have an appearance design effect by giving printing, coating, metallic thin film, or the like to a plastic material manufactured without mixing a colored material to it. An example of such colored layer is a finisher. A finisher is manufactured in a manner that a body is formed from a resin such as a polyphenylene ether (PPE) by injection molding, or the like and then the body is colored in the same color as a vehicle body by coating or plating to be added an metallic appearance. A finisher is a combination of an appearance-providing layer and a second intermediate layer, so to speak.

The colored layer may be formed in the form of a metallic coating by metal plating, metal evaporating, or the like. The metal coating may be formed, for example, by the evaporation, spattering, or the like of a metallic material such as aluminum, chrome, or tin, or else by coating of a resin or the like in which metallic powder such as aluminum powder is distributed, printing or coating (including electrostatic coating) of pearl mica paint, or the like. Furthermore, the metallic coating may be formed by coating, resin-extruding, or adhering a film or sheet having a desired appearance. A material for forming a coating used here preferably provides a desired appearance and has excellent weather resistance required for a lamp cover.

The appearance-providing layer may additionally have patterns, pictures, letters, etc. as required. Because the appearance design effect of the decorative article is more improved.

The thickness of the appearance-providing layer may be widely changed according to a desired appearance design effect or the like, but is usually in the approx.5 to 500 µm range, more preferably, in the approx.20 to 100 µm range. However, when the appearance-providing layer has some thickness and/or shape, a thickness beyond the above range may be adopted as a matter of course.

The light-storage layer is preferably formed from a layer or member containing light-storing material. The light-storing material is preferably light-storing pigment, and generally a sulfide pigment, aluminate pigment, or the like. The light-storage layer is preferably formed from aluminate pigment in combination with an activator such as an europium in order to enhance brightness and afterglow performance. An example of such light-storing pigment is but not limited to an aluminate strontium fluorescent material activated by europium cisprocium, an aluminate calcium fluorescent material activated by europium neodymium yttrium, an alminate barium fluorescent material activated by europium neodymium, or the like. These light-storing pigments can usually provide a steady afterglow for a long time of 10 to 15 hours. Further, these light-storing pigments may be used alone or in combination of two or more.

Adequate amount of the light-storing material is usually mixed into resin material to be used advantageously. Resin material suitable for forming a light-storage layer is, for example, resin material as used for forming an appearance-providing layer. The amount of the light-storing material to be mixed with such resin material is substantially up to a half of the total amount of the light-storage layer, but not limited to this amount. Usually, approx.10 to 50 weight % of the light-storing material is preferable.

The thickness of the light-storage layer may be widely changed according to a desired appearance design effect or the like, but is usually in the approx.5 to 500 µm range, more preferably, in the approx.20 to 100 µm range. However, when the appearance-providing layer has some thickness and/or shape, a thickness beyond the above range may be adopted as a matter of course.

A decorative article according to the present invention is preferable provided with an intermediate layer adjacent to an appearance-providing layer or light-storage layer in order to increase the bending strength of it and so on. The intermediate layer can act as, for example, a junction layer, supporting layer, base layer, or concealing layer. Appropriate intermediate layers include, for example, a junction layer made of polyurethane resin, etc., or a base layer made of polyester resin, polyphenylene ether resin, etc. These intermediate layers may be a single layer or a multiplayer consisting of two or more layers.

The decorative article further comprises an adhesive layer in general in order to be adhered to the lamp cover. The adhesive layer used here may be formed by using adhesive used regularly in the fields of adhesive tape, etc., for example, adhesive of pressure sensitive type, heat sensitive type, photo-curing type, or the like. Adequate adhesive is, for example, heat-sensitive adhesive such as acrylic adhesive, rubber adhesive, polyurethane adhesive, or polyester adhesive, and in particular acrylic adhesive can be used advantageously when a weather resistance, etc are considered. In case of pressure-sensitive adhesive, the decorative article is compressed and adhered to the lamp cover, and in case of heat-sensitive adhesive, the decorative cover is adhered to the lamp cover while heating the decorative cover, or to the pre-heated lamp cover, or is compressed and then adhered to the lamp cover while heating the decorative cover together with the lamp cover. Furthermore, instead of that the decorative article is provided with an adhesive layer, the lamp cover may be provided with an adhesive layer in advance. Furthermore, a pressure sensitive adhesive double-coated tape or the like may be used instead of an adhesive layer.

The adhesive layer is usually transparent. But, if the decorative article is adhered to the outer surface of the lamp cover, it is not necessary no longer that the decorative cover is transparent provided that the adhesive layer itself has a light-storing function. Furthermore, also when the adhesive layer is partially used, it is not always necessary that the adhesive layer is transparent provided that it does not affect the afterglow of the light-storage layer. In short, the light-storage layer may be disposed at any position nearer the light source than the appearance-providing layer, if the layers from the layer nearest to the light source to the light-storage layer are even partially light-transmittive when they are seen from the adhesive layer.

The thickness of the adhesive layer may be widely changed, but is usually in the approx.10 to 500 µm range, more preferably, in the approx.20 to 100 µm range. When the thickness of the adhesive layer is less than 10 µm, a satisfactory adhesive force can not be obtained. On the contrary, when the thickness of the adhesive layer is larger than 500 µm, the total thickness of the decorative article becomes very large. Actually, when the adhesive layer is adhered to the outer surface of the lamp cover, the adhesive layer is in the state of jutting from the lamp cover, thus giving a sense of incongruity. Further, the thickness of the pressure sensitive adhesive double-coated tape is usually approx. 1 mm.

A decorative article according to the present invention preferably further comprises a clear layer as the outermost layer thereof when the decorative article is adhered to the outer face of the lamp cover. The clear layer preferably has a weather resistance and a heat resistance in addition to transparency which is basically an essential nature, from the view point of acting as a protection film. Further, the clear layer preferably has good adherence to the underlayer of it.

Appropriate resins to form the clear layer include but not limited to polyester resin, polyethylene resin, polycarbonate resin, vinyl chloride resin, acrylic resin, polyurethane resin, polyolefin resin, fluorine resin (PVdF, ETFE, etc.), etc. These resins may be used, as required, in the form of a mixture or copolymer. Furthermore, the clear layer can give a shine to the lamp cover to improve the appearance of the lamp cover.

It is preferred that ultraviolet absorber is mixed into the clear layer in order to increase the weather resistance of it. Appropriate ultraviolet absorbers include but not limited to benzotriazole ultraviolet absorber, benzophenon ultraviolet absorber, cyanoacrylate ultraviolet absorber, etc.

Furthermore, the thickness of the clear layer may be changed widely according to a desired effect or the like, but is usually in the approx.10 to 500 µm range, more preferably, in the approx.20 to 100 µm range. When the thickness of the clear layer is less than 10 µm, it can not act as a protection film. On the contrary, when the thickness of the clear layer is larger than 500 µm, the total thickness of the decorative film becomes too large.

As described above, a vehicular lamp according to the present invention has a feature that its lamp cover is provided with a light-storing decorative article having a appearance-providing layer according to the present invention at a portion other than the path of the light from the light source. In a vehicular lamp having such structure, an excellent appearance design effect originated from the appearance-providing layer ca be obtained while the vehicle is running or stopping. Furthermore, when the light source is lit, the light from the light source is emitted out of the lamp without being affected by the decorative article, and thereby fundamental functions of the lamp do not affect. In addition, when the light source is lit, the light refracted and scattered complicatedly in the lamp room can fit the decorative article. Such light which has hit the decorative article is emitted again in the lamp room as afterglow by the light-storing function of the light-storage layer. As a result, in the night-time, the lamp room is illuminated brightly with afterglow continuously emitted by the light-storage layer while the light source is not lit, and thereby a beautiful appearance attracting a person's attention is obtained. Since the afterglow in this case is surface-emitted light, an even appearance different from an appearance obtained by the light from the light source is obtained. Furthermore, this lighting effect may be changed variously by changing the kind of the light-storing pigment or by previously coloring a layer through which the light passes. In order to enhance this effect provided by afterglow, the inner wall of the housing is preferably colored in a plating-tone by aluminum evaporation or the like. A reflecting film such as an aluminum-evaporated surface reflects afterglow, and thereby a glittering colored appearance would be obtained.

EXAMPLES

The present invention is described below with reference to its examples.

FIGS. 5 to 11 each shows an example use of a decorative article according to the present invention.

Figure 5:
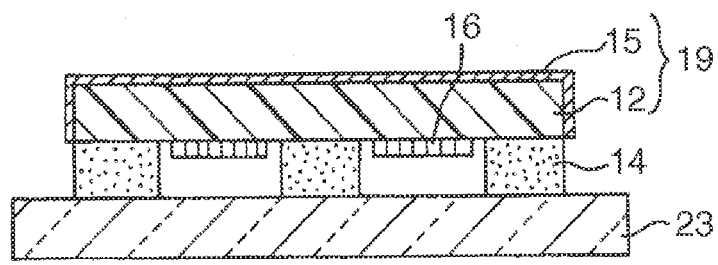
FIG. 5 is a cross-sectional view showing a preferred example use of a decorative article according to the present invention.

FIG. 5 shows a decorative article according to the present invention, which is a lamp finisher. The finisher 19 comprises a finisher body (a second intermediate layer in the present invention) 12 consisting of a resin-formed member, and a metallic coating (appearance-providing layer) 15 covering the surface of finisher body 12, the color of which is the same as the color of a vehicle's body. The finisher 19 is adhered to the outside of the lamp cover 23, i.e., a non-light-emitting area, with a pressure sensitive adhesive double-coated tape 14. Sections of the back area of the finisher 19, where the pressure sensitive adhesive double-coated tape 14 is not adhered, are provided with a light-storage layer 16. The light-storage layer 16 is, for example, a film, panel, formed member, coating by printing or painting, or the like.

Figure 6:
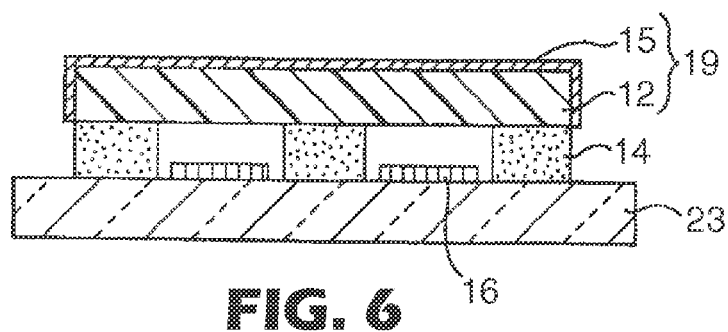
FIG. 6 is a cross-sectional view showing anther preferred example use of a decorative article according to the present invention.

FIG. 6 shows a variation of the decorative article shown in FIG. 5. The finisher 19 of this decorative article also comprises a finisher body (a second intermediate layer) 12 consisting of a resin-formed member, and a metallic coating (appearance-providing layer) 15 covering the surface of finisher body 12, the color of which is the same as the color of a vehicle's body. The finisher 19 is adhered to the outside of the lamp cover 23, i.e., a non-light-emitting area, with a pressure sensitive adhesive double-coated tape 14. In this decorative article, instead of the back of the finisher, sections of the surface of the lamp cover 23, where the pressure sensitive adhesive double-coated tape 14 is not adhered, are provided with a light-storage layer 16. The light-storage layer 16 is, for example, a film, panel, formed member, coating by printing or painting, or the like.

Figure 7:
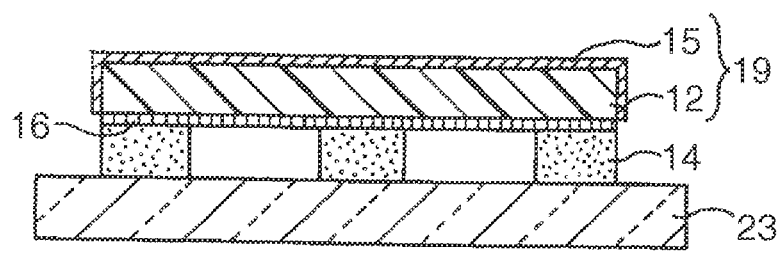
FIG. 7 is a cross-sectional view showing anther preferred example use of a decorative article according to the present invention.

FIG. 7 shows a variation of the decorative article shown in FIGS. 5 and 6. This finisher 19 also comprises a finisher body (a second intermediate layer) 12 consisting of a resin-formed member, and a metallic coating (appearance-providing layer) 15 covering the surface of finisher body 12, the color of which is the same as the color of a vehicle's body. But, this decorative article has a light-storage layer 16 on the whole of the back of the finisher 19. The light-storage layer 16 is, for example, a film, coating by printing or painting, or the like. Furthermore, the finisher 19 is adhered to the outside of the lamp cover 23, i.e., a non-light-emitting area, with a pressure sensitive adhesive double-coated tape 14.

Figure 8:
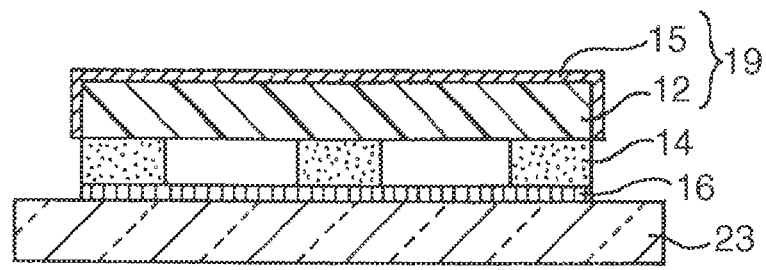
FIG. 8 is a cross-sectional view showing another preferred example use of a decorative article according to the present invention.

FIG. 8 shows a variation of the decorative article shown in FIG. 7. This finisher 19 also comprises a finisher body (a second intermediate layer) 12 consisting of a resin-formed member, and a metallic coating (appearance-providing layer) 15 covering the surface of finisher body 12, the color of which is the same as the color of a vehicle's body. But, this decorative article has a light-storage layer 16 on the surface of the light-storage layer 16, instead of on the whole of the back of the finisher 19. The light-storage layer 16 is, for example, a film, coating by printing or painting, or the like. That is, this decorative article is so designed that the light-storage layer 16 is provided on the outside of the lamp cover 23, i.e., a non-light-emitting area, and then the finisher 19 is adhered to the light-storage layer 16 with a pressure sensitive adhesive double-coated tape 14.

Figure 9:
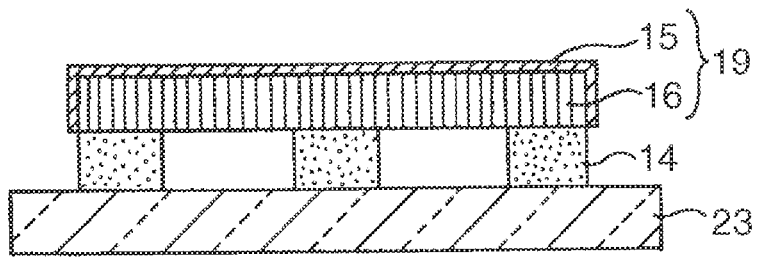
FIG. 9 is a cross-sectional view showing a further preferred example use of a decorative article according to the present invention.

The finisher 19 shown in FIG. 9 itself has a light storing function in contrast to the finishers shown in FIGS. 5 to 8. That is, the finisher 19 comprises a finisher body (a second intermediate layer) 12 consisting of a resin-formed member in which light-storing pigment is distributed, and a metallic coating (appearance-providing layer) 15 covering the surface of finisher body 12, the color of which is the same as the color of a vehicle's body. The finisher 19 is adhered to the outside of the lamp cover 23, i.e., a non-light-emitting area, with a pressure sensitive adhesive double-coated tape 14.

Figure 10:
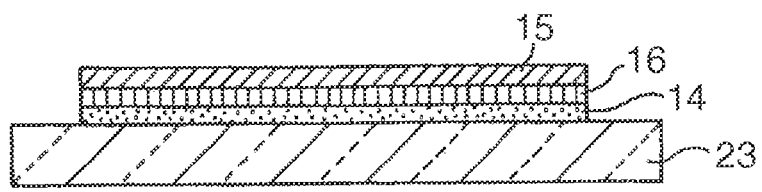
FIG. 10 is a cross-sectional view showing a further preferred example use of a decorative article according to the present invention.
Figure 11:
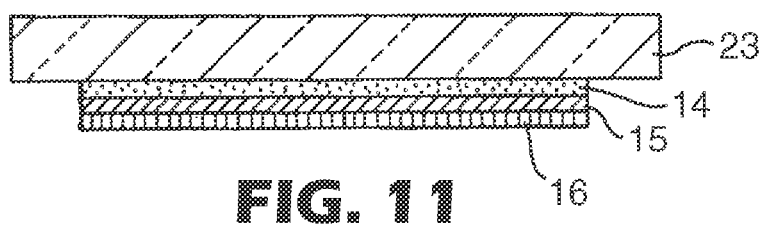
FIG. 11 is a cross-sectional view showing a further preferred example use of a decorative article according to the present invention.

FIGS. 10 and 11 show examples of a decorative article according to the present invention, which are shaped like a film having a simple structure. The decorative article shaped like a film in FIG. 10 is adhered to the outer surface of a lamp cover 23 through an adhesive layer 14, and comprises a light-storage layer 16 and an appearance-providing layer 15 laid on it. Each of the light-storage layer 16 and the appearance-providing layer 15 is a film, or coating by printing or painting, or the like. There may be a clear layer on the appearance-providing layer 15.

The film-shaped decorative article of FIG. 11 is adhered to the inner surface of a lamp cover 23 through an adhesive layer 14, and comprises an appearance-providing layer 15 and a light-storage layer 16 disposed nearer to a light source (not shown) than it. The light-storage layer 16 and the appearance-providing layer 15 are a film, or coating by printing or painting, or the like. There may be a clear layer on the appearance-providing layer 15. Each of the appearance-providing layer 15 and the light-storage layer 16 is a film, or coating by printing or painting, or the like.

The decorative articles shown in FIGS. 5 to 11 are typical examples, and may be changed to various forms within the scope of the present invention as previously described with reference to FIGS. 3 and 4.

Production and Evaluation of Decorative Article

A film-shaped decorative article having a layer constitution as described in Table 1 was made.

This decorative article is designed to be adhered to the outside of a lamp cover.

TABLE 1

| Clear Layer | Polyurethane, 15 µm thickness | Colorless and Transparent |
|---|---|---|
| Appearance-providing Layer | Polyurethane, 5 µm thickness | Silver (corresponding to vehicle body's color) |
| Concealing Layer | polyurethane, 10 µm thickness | White |
| Light-storage layer | Polyurethane, 60 µm thickness | Light Yellow Green |
| Base Layer | Soft PVC Film, 50 µm thickness | Colorless and Transparent |
| Adhesive Layer | Acrylic Adhesive, 30 µm thickness | Colorless and Transparent |

Each of the all layers was made by using a coating or film which is tried and true outdoors in the field of the vehicular exterior features. In the light-storage layer, light-storing pigment which is an aluminate strontium fluorescent material activated by europium cisprocium, ("LumiNova" of Nemoto & Co. Ltd, Japan), was composed at the rate of 50 weight %.

Obtained decorative article shaped like a film was cut to pieces of approx. 3 cm width×approx. 25 cm long, and then compressed and adhered to a headlamp (approx. 25 cm×approx. 20 cm height) of a commercial passenger car, which has a lamp cover (approx. 2 mm thickness) whose surface and back are even and transparent and whose lamp room is seen as far as its inside. The decorative article piece was adhered to the upper end of the non-light-emitting area (other than the light path) of the outer surface of the lamp cover.

The appearance of the lamp was observed in the daytime (when it was not lit) and in the nighttime (when it was lit or not lit), and the following observation result was obtained.

Daytime/Lamp not Lit:

The decorative article at the upper end of the lamp and the vehicle's body were seen with continuity. Furthermore, the headlamp appeared horizontally long, and as in the case that a headlamp garnish generally called eye line was provided, remarkable improvement of the appearance was achieved.

Nighttime/Lamp Lit:

The function of the headlamp of lighting up front objects was not affected at all.

Nighttime/Lamp Lit:

When the lamp was turned off after it had been lit, the inside of the lamp room was illuminated almost evenly with yellow green. The illumination with yellow green continued with stability for approx. 15 minutes.

As described above, the present invention provides a decorative article capable of being used in combination with an article having a light source and of remarkably improving the decorative effect together with the light source.

Further, the present invention provides a decorative article capable of providing an excellent decorative effect in the daytime and an appearance design effect attracting a person's attention in the nighttime when it is attached to a vehicular lamp or other lamp.

Furthermore, the present invention provides a decorative article which is able to provide an excellent decorative effect in the daytime and an appearance design effect attracting a person's attention in the nighttime and does not violate current laws.

The invention claimed is:

1. A lamp comprising:
a light source of visible light, a housing accommodating said light source and defining a lamp room, a light-emitting opening provided at the front of said housing, and a light-transmissive lamp cover attached to the light-emitting opening;
wherein said lamp cover comprises a first area that substantially allows the emission of visible light from said light source and a second area that does not allow the emission of visible light directly from said light source; and
wherein only the second area of said lamp cover is provided with a decorative article comprising, at least, an appearance-providing layer defining an appearance of the decorative article, and a light-storage layer which is disposed under the appearance-providing layer and is able to store visible light from said light source and generate afterglow into said lamp room.

2. The lamp according to claim 1, wherein said appearance-providing layer of said decorative article is a printed layer, a coated layer, a colored resin layer, a metal-plated layer, a metal-evaporated layer, a metal foil layer, or a colored layer or colored member.

3. The lamp according to claim 2, wherein said light-storage layer of said decorative article is a layer or member containing visible light-storing pigment.

4. The lamp according to claim 2, wherein said decorative article is a multilayered film comprising at least said appearance-providing layer and said light-storage layer.

5. The lamp according to claim 1, wherein said light-storage layer of said decorative article is a layer or member containing visible light-storing pigment.

6. The lamp according to claim 5, wherein said decorative article is a multilayered film comprising at least said appearance-providing layer and said light-storage layer.

7. The lamp according to claim 1, wherein said decorative article is a multilayered film comprising at least said appearance-providing layer and said light-storage layer.

8. The lamp according to claim 1, wherein said decorative article further comprises an adhesive layer consisting of a pressure-sensitive adhesive or a heat-sensitive adhesive.

9. The lamp according to claim 1, wherein said decorative article further comprises a clear layer as an outermost layer when said decorative article is attached to the outer surface of said lamp cover.

10. The lamp according to claim 1, wherein said decorative article is a lamp garnish or a finisher.

11. The lamp according to claim 1, wherein said lamp cover includes an area having a lighting function and an area having a decorative function.

12. The lamp according to claim 11, wherein the area having a lighting function is the first area of said lamp cover and wherein the area having a decorative function is the second area of said lamp cover.

* * * * *